(12) United States Patent
Wang et al.

(10) Patent No.: US 11,677,218 B2
(45) Date of Patent: Jun. 13, 2023

(54) METHOD FOR PROCESSING A REACTION FORCE CONE OF A CABLE MAIN INSULATING LAYER

(71) Applicant: STATE GRID HUZHOU POWER SUPPLY COMPANY, Huzhou Zhejiang (CN)

(72) Inventors: Xiaojian Wang, Huzhou Zhejiang (CN); Zhen Chen, Huzhou Zhejiang (CN); Jing Xu, Huzhou Zhejiang (CN); Keqin Ye, Huzhou Zhejiang (CN); Weixun Qin, Huzhou Zhejiang (CN); Wenhui Xu, Huzhou Zhejiang (CN); Xinhang Chen, Huzhou Zhejiang (CN); Zhen Wang, Huzhou Zhejiang (CN); Meng Tang, Huzhou Zhejiang (CN); Feng Zhou, Huzhou Zhejiang (CN); Bin Tian, Huzhou Zhejiang (CN); Yongsheng Xu, Huzhou Zhejiang (CN); Yudong Rui, Huzhou Zhejiang (CN)

(73) Assignee: STATE GRID HUZHOU POWER SUPPLY COMPANY, Zhejiang (CN)

( * ) Notice: Subject to any disclaimer, the term of this patent is extended or adjusted under 35 U.S.C. 154(b) by 362 days.

(21) Appl. No.: 16/950,722

(22) Filed: Nov. 17, 2020

(65) Prior Publication Data
US 2021/0376582 A1    Dec. 2, 2021

(30) Foreign Application Priority Data

May 28, 2020    (CN) .......................... 202010469287.8

(51) Int. Cl.
*H02G 1/12* (2006.01)
*F16H 19/04* (2006.01)
(Continued)

(52) U.S. Cl.
CPC ......... *H02G 1/1265* (2013.01); *H02G 1/1256* (2013.01); *F16H 1/28* (2013.01); *F16H 25/20* (2013.01)

(58) Field of Classification Search
CPC . Y10T 83/0267; Y10T 83/04; Y10T 83/0304; Y10T 83/0311; Y10T 83/0319;
(Continued)

(56) References Cited

U.S. PATENT DOCUMENTS

| | | | | |
|---|---|---|---|---|
| 2006/0011025 A1* | 1/2006 | Chen | ........................ | B26D 3/16 83/13 |
| 2013/0309406 A1* | 11/2013 | Yokota | ................... | H02G 1/126 118/56 |

(Continued)

FOREIGN PATENT DOCUMENTS

| | | | |
|---|---|---|---|
| CN | 208637939 U | 3/2019 | |
| CN | 111130028 A | 5/2020 | |

(Continued)

*Primary Examiner* — Phong H Nguyen
(74) *Attorney, Agent, or Firm* — ArentFox Schiff LLP

(57) ABSTRACT

The present disclosure relates to the technical field of cable processing, and discloses a method for processing a reaction force cone of a cable main insulating layer. The method includes: two ends of a cable are clamped through a clamping device, and the cable is enabled to pass through a cutting device; a cutting depth of the cutting device in a radial direction and a cutting position of the cutting device in an axial direction are adjusted; the cutting device is started, and the cable is cut by the cutting device to form the reaction force cone.

8 Claims, 7 Drawing Sheets

(51) Int. Cl.
*F16H 1/28* (2006.01)
*F16H 25/20* (2006.01)

(58) Field of Classification Search
CPC ............. Y10T 83/0326; Y10T 83/5669; Y10T 83/5724; Y10T 83/5773; H02G 1/1265; H02G 1/1248; H02G 1/1253; H02G 1/1256; H02G 1/00; H02G 1/005; F16H 1/28; F16H 25/20; F16H 25/02; F16H 25/08; F16H 25/14; F16H 25/18; B23D 21/00; B23D 21/003; B23D 21/04
USPC ......... 81/9.4, 9.51; 82/45, 56, 85, 83; 30/92, 30/96
See application file for complete search history.

(56) References Cited

U.S. PATENT DOCUMENTS

2014/0318341 A1\* 10/2014 Fait .................... B27B 27/08
83/477
2020/0313450 A1\* 10/2020 Lin ..................... H04M 1/04

FOREIGN PATENT DOCUMENTS

DE          3825152    \*  1/1990    ........... B23D 45/124
JP          4005948 B2    11/2007

\* cited by examiner

METHOD FOR PROCESSING A REACTION FORCE CONE OF A CABLE MAIN INSULATING LAYER

CROSS-REFERENCE TO RELATED APPLICATION(S)

This application claims priority to Chinese patent applications No. 202010469287.8 filed on May 28, 2020, disclosure of which is incorporated herein by reference in its entirety.

TECHNICAL FIELD

The present disclosure relates to the technical field of cable processing, and in particular to a method for processing a reaction force cone of a cable main insulating layer.

BACKGROUND

High-voltage direct current power transmission has advantages of high transmission efficiency and low energy loss. Since the high-voltage direct current power transmission is more economical than alternating current power transmission, the high-voltage direct current power transmission is widely used for long-distance or ultra-long-distance power transmission. However, due to the limitation of manufacturing process of a high-voltage cable, a maximum length of a manufactured jointless cable is 10 km. In a case where the ultra-long-distance transmission is to be achieved, a single cable joint needs to be processed to make a plurality of cables be spliced together. Since there are two different insulating materials of cable body insulation and additional insulation at a cable connection, an electric field distribution of the cable connection is different from an electric field distribution of the cable body, causing a certain potential difference between two adjacent points on the same layer of insulation, where the certain potential difference is an axial field strength, i.e., an axial stress. Therefore, an insulating layer close to a conductor connection end is usually cut into a tapered surface, that is, a reaction force cone, and then wrapped with additional winding insulation, so that two ends of the additional winding insulation form stress cone surfaces. A potential distribution on the insulating surface is changed to play a role in equalizing an electric field, thereby ensuring the safety of the joint.

In order to ensure sufficient safety, requirements for the forming of the reaction force cone are relatively high. At present, the reaction force cones are mostly cut out manually by using the glass sheet. This method is time-consuming and laborious, and the quality of the cut-out reaction force cone is poor and difficult to standardize. Although some devices assisting manual labor to cut and peel the reaction force cone exist, the devices are often cumbersome to operate and inefficient, and can only play an auxiliary role.

SUMMARY

The present disclosure provides a method for processing a reaction force cone of a cable main insulating layer, which can achieve automatic processing of the reaction force cone, and the forming quality is good.

A method for processing a reaction force cone of a cable main insulating layer is provided, which includes following steps.

In S01, two ends of a cable are clamped through a clamping device, and the cable is enabled to pass through a cutting device.

In S02, a cutting depth of the cutting device in a radial direction and a cutting position of the cutting device in an axial direction are adjusted.

In S03, the cutting device is started, and the cable is cut by the cutting device to form the reaction force cone.

Alternatively, in the step S01, the clamping device includes a clamping bracket, and two clamping jaws slidably disposed on the clamping bracket and configured to be close to and far away from each other.

Alternatively, the clamping device further includes a clamping gear which is rotatable, and two clamping racks engaged with the clamping gear, where each of the two clamping jaws is connected to a respective one of the two clamping racks.

Alternatively, the clamping device further includes a rocker configured to drive the clamping gear to rotate, and a locking bolt configured to lock the rocker.

Alternatively, in the step S02, the cutting device includes a driving assembly and a cutting tool driven by the driving assembly to rotate and move in the radial direction.

Alternatively, the driving assembly includes a first driving piece, a second driving piece, and a planetary gear set jointly driven by the first driving piece and the second driving piece, where the planetary gear set is capable of driving the cutting tool to rotate synchronously and move in the radial direction.

Alternatively, the planetary gear set includes a planetary carrier, a fixed gear driven by the first driving piece to rotate, a ring gear driven by the second driving piece to rotate, a planetary gear engaged between the fixed gear and the ring gear, and a tool drive gear driven by the planetary gear to rotate synchronously, where the tool drive gear is engaged with a rack fixed to the cutting tool, and the planetary carrier is fixedly sleeved on the fixed gear to support the ring gear and the planetary gear.

Alternatively, the driving assembly further includes a power input gear fixedly connected to the fixed gear, where an output end of the first driving piece is capable of driving the power input gear to rotate.

Alternatively, the cutting device is driven by a transverse feed device to move in the axial direction, and the transverse feed device includes a supporting base, a transverse feed motor mounted on the supporting base, a lead screw driven by the transverse feed motor to rotate, a slider threadedly connected to the lead screw and fixedly connected to the cutting device, and a slide rail fixedly disposed, where the slider is slidably disposed on the slide rail.

The present disclosure can realize that: the cable is clamped by the clamping device to ensure the stability of the cable during processing, and the surface of the cable after being cut is smooth without the need for secondary trimming. The cutting device is provided to adjust the cutting depth to cut the cable, and the cutting device moves in the axial direction, which can achieve the automatic processing of the reaction force cone, and the forming quality is good. In addition, the cutting device of the present disclosure drives, through the driving assembly, the cutting tool to move in the radial direction of the cable, and the cutting depth is adjustable, so that the processing apparatus can be adapted to the processing requirements of reaction force cones with different sizes.

Figure 1:
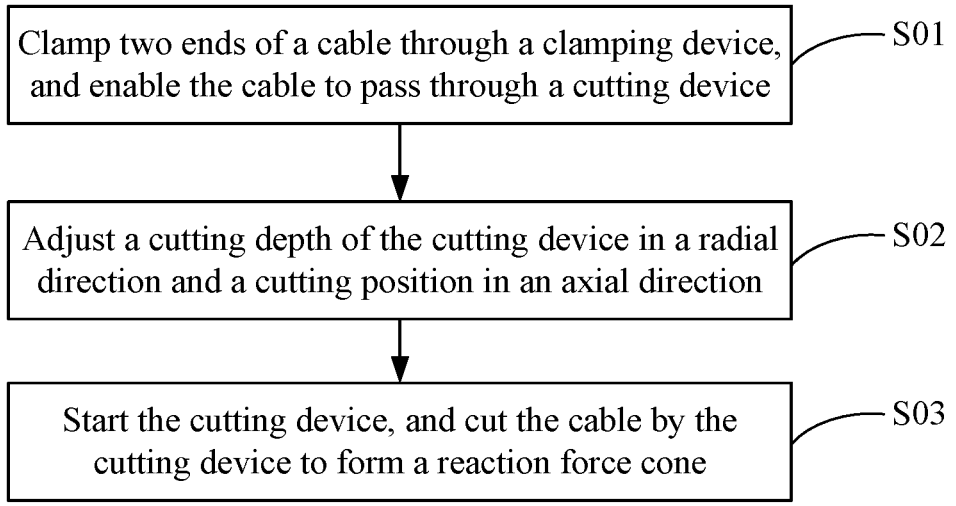
FIG. 1 is a flowchart of a method for processing a reaction force cone of a cable main insulating layer according to the present disclosure.

REFERENCE LIST 1 supporting seat
2 clamping device
21 clamping bracket
22 clamping jaw
23 clamping gear
24 clamping rack
25 rocker
26 locking bolt
3 cutting device
30 cutting carrier body
31 driving assembly
311 first driving piece
312 second driving piece
313 planetary gear set
3131 planetary carrier
3132 fixed gear
3133 ring gear
3134 planetary gear
3135 tool drive gear
3136 rack
3137 gear shaft
314 power input gear
315 first transmission gear
316 second transmission gear
32 cutting tool
3 transverse feed device
41 supporting base
42 transverse feed motor
43 lead screw
44 slider
45 slide rail
10 cable

DETAILED DESCRIPTION

The present disclosure will be further described in detail below with reference to the drawings and embodiments. It should be understood that the embodiments described herein are merely used for explaining the present disclosure, but not to limit the present disclosure.

In the description of the present disclosure, it should be noted that unless otherwise expressly specified and limited, the terms "connected to each other", "connected" and "fixed" are to be construed in a broad sense as fixedly connected, detachably connected or integrated; mechanically connected or electrically connected; directly connected to each other or indirectly connected to each other via an intermediary; or internally connected between two components or interactional between two components. For those of ordinary skill in the art, specific meanings of the preceding terms in the present disclosure may be understood based on specific situations.

In the present disclosure, unless otherwise expressly specified and limited, when a first feature is described as "on" or "below" a second feature, the first feature and the second feature may be in direct contact, or be in contract via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "below", "under" or "underneath" the second feature, the first feature is right below, under or underneath the second feature or the first feature is obliquely below, under or underneath the second feature, or the first feature is simply at a lower level than the second feature.

In the description of the embodiment, orientations or position relations indicated by terms such as "upper", "lower" and "right" are based on orientations or position relations shown in the drawings. These orientations or position relations are intended only to facilitate description and simplify operations and not to indicate or imply that a device or element referred to must have such specific orientations or must be configured or operated in such specific orientations. Thus, these orientations or position relations are not to be construed as limiting the present disclosure. In addition, the terms "first" and "second" are used merely for distinguishing in description and have no special meaning.

The present disclosure provides a method for processing a reaction force cone of a cable main insulating layer. In the method, a reaction force cone processing apparatus of a cable main insulating layer is adopted to achieve automatic processing of reaction force cones with different sizes, and the forming quality is good. As shown in FIG. 1, the method for processing the reaction force cone of the cable main insulating layer includes steps described below.

In S01, two ends of the cable are clamped through a clamping device and the cable is enabled to pass through a cutting device.

Figure 2:
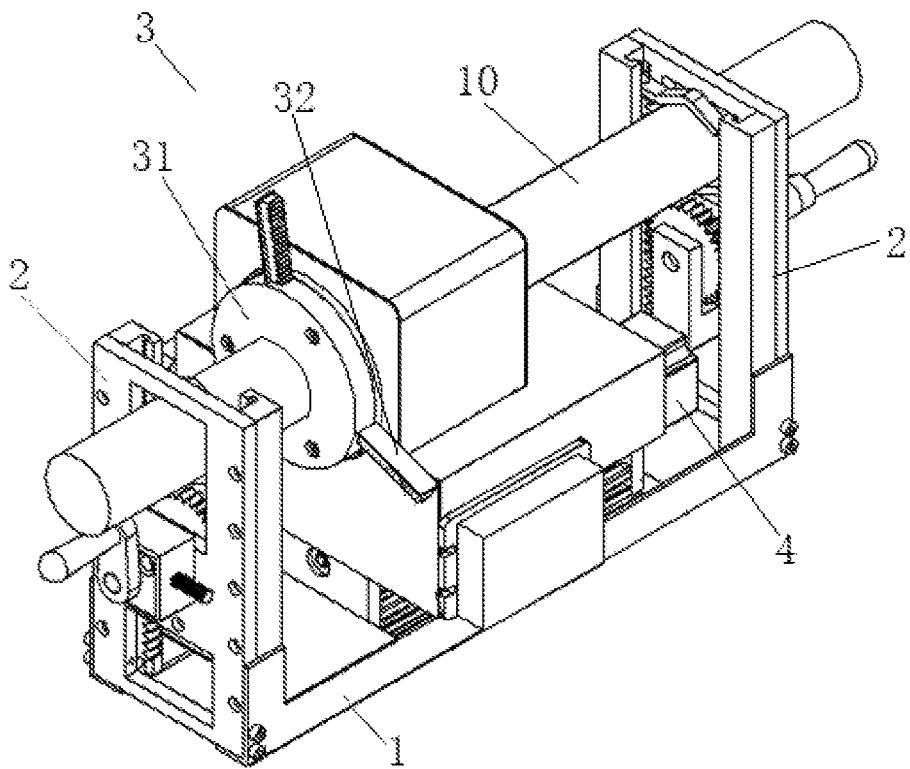
FIG. 2 is a perspective view of an apparatus for processing a reaction force cone of a cable main insulating layer applied in a method for processing a reaction force cone of a cable main insulating layer according to the present disclosure.
Figure 3:
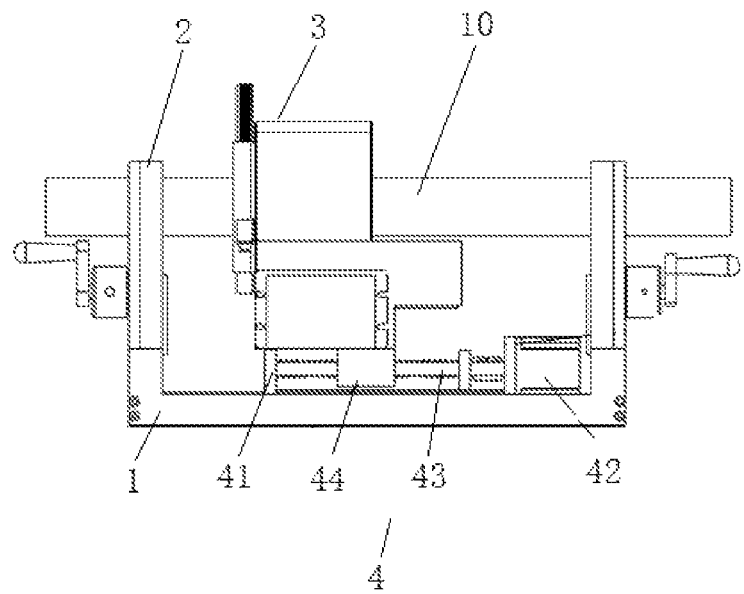
FIG. 3 is a side view of a method for processing a reaction force cone of a cable main insulating layer according to the present disclosure.
Figure 4:
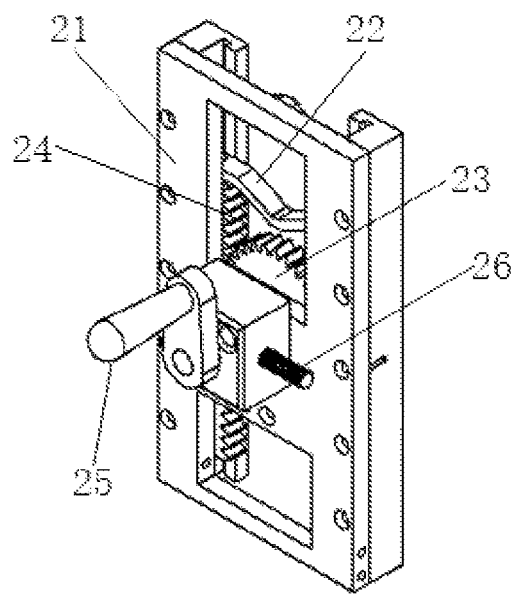
FIG. 4 is a perspective view of a clamping device according to the present disclosure.
Figure 5:
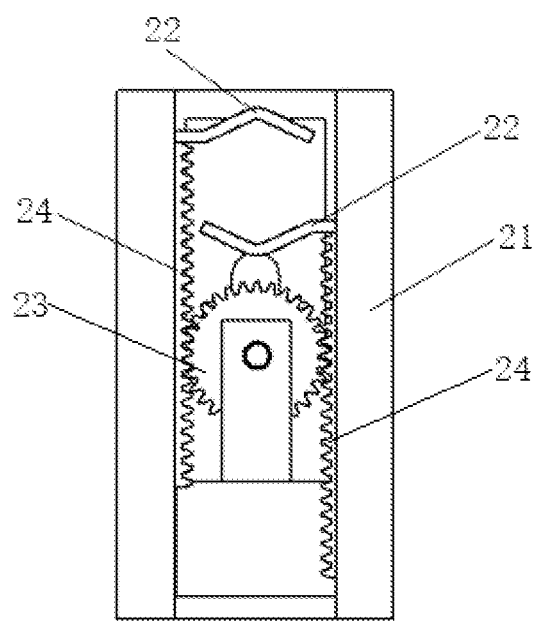
FIG. 5 is a front view of a clamping device according to the present disclosure.
Figure 6:
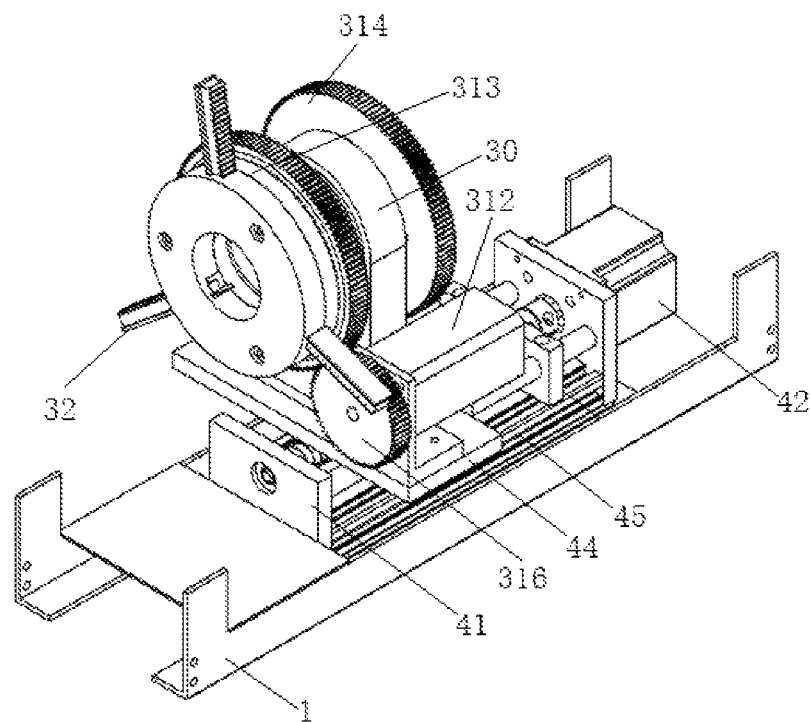
FIG. 6 is an assembly structural view of a cutting device and a transverse feed device according to the present disclosure.

That is, before the reaction force cone is processed, a cable 10 to be processed needs to be clamped and fixed, and in this embodiment, the clamping device 2 is used to clamp and fix the two ends of the cable 10. Specifically, as shown in FIGS. 2 and 3, the clamping device 2 is mounted on a supporting seat 1, two sets of clamping devices 2 may be provided, and the two sets of clamping devices 2 are respectively disposed on two ends of the supporting seat 1 to clamp and fix the cable 10. As shown in FIGS. 4 and 5, the clamping device 2 includes a clamping bracket 21 and two clamping jaws 22 slidably disposed on the clamping bracket 21, and the two clamping jaws 22 can be close to each other to clamp the cable 10, or can be far away from each other to release the clamp on the cable 10. In this embodiment, the two clamping jaws 22 achieve sliding through a structure described below. As shown in FIGS. 4 and 5, the clamping device 2 further includes a rotatable rocker 25, a clamping gear 23 fixed to an end of the rocker 25, and clamping racks 24 respectively disposed on two sides of the clamping gear 23 and engaged with the clamping gear 23. The clamping racks 24 are vertically disposed, and each clamping jaw 22 is fixed to one end of one clamping rack 24. The rocker 25 is rotated to drive the clamping gear 23 to rotate, thereby enabling the clamping rack 24 to move up or down, and the clamping rack 24 drives the clamping jaw 22 to move up or down. It should be noted that, in this embodiment, since the two clamping racks 24 are respectively disposed on two sides of the clamping gear 23, moving directions of the two clamping racks 24 are opposite, so that the two clamping jaws 22 can be close to and far away from each other.

As shown in FIG. 5, the clamping jaw 22 may alternatively adopt a plate-shaped structure, and the clamping jaw 22 may be in a V shape or an arc shape to match the shape of the cable 10.

In this embodiment, the rocker 25 may be manually rotated, that is, the clamping jaw 22 can be clamped or released directly through hand-cranking of the rocker 25. The rocker 25 may also be driven by a driving member such as a motor to rotate.

Further, the clamping device 2 in this embodiment further includes a locking bolt 26, and the locking bolt 26 can lock a position of the rocker 25 to achieve the fixation of a position of the clamping jaw 22, thereby enabling the clamping jaw 22 to clamp the cable 1 more stably and reliably. The locking of the rocker 25 by the locking bolt 26 may be achieved in a manner of an end of the locking bolt 26 abutting against the rocker 25 so as to prevent the rocker 25 from rotating, or the locking of the rocker 25 is achieved in a manner of other structures cooperating with the locking bolt 26.

The clamping device 2 is provided to ensure the stability during the cable processing process, and the surface of the cable after being cut is smooth without the need for secondary trimming.

In S02, a cutting depth of the cutting device in a radial direction and a cutting position of the cutting device in an axial direction are adjusted.

That is, after the cable 10 is clamped and fixed, the preparation before cutting can be performed. Specifically, the cutting depth of the cutting device in the radial direction and the cutting position in the axial direction can be adjusted according to a required size of the reaction force cone. In this embodiment, the cutting device 3 is slidably disposed on the supporting seat 1, and the cutting of the cable 10 can be achieved by the cutting device 3 to form a required reaction force cone. Optionally, as shown in FIGS. 6 to 10, the cutting device 3 includes a cutting carrier body 30, a driving assembly 31 mounted on the cutting carrier body 30, and a cutting tool 32 driven by the driving assembly 31. The driving assembly 31 can drive the cutting tool 32 to rotate and move along a radial direction of the cable 10 to adjust the cutting depth. Exemplarily, the driving assembly 31 includes a first driving piece 311, a second driving piece 312, and a planetary gear set 313. The cutting tool 32 is driven by the planetary gear set 313 to rotate and move in the radial direction along the cable 10, where the first driving piece 311 and the second driving piece 312 jointly drive the planetary gear set 313 to rotate, and enable the planetary gear set 313 to drive the cutting tool 32 to rotate. In addition, the first driving piece 311 and the second driving piece 312 can also enable the planetary gear set 313 to drive the cutting tool 32 to move in the radial direction along the cable 10 to adjust the cutting depth.

As shown in FIGS. 6 to 10, preferably, the planetary gear set 313 includes a planetary carrier 3131, a fixed gear 3132, a ring gear 3133, a planetary gear 3134, and a tool drive gear 3135, where one end of the fixed gear 3132 rotatably passes through the cutting carrier body 30 and is supported by the cutting carrier body 30, and the end of the fixed gear 3132 is driven by the first driving piece 311 to rotate. The planetary carrier 3131 is fixedly sleeved on the other end of the fixed gear 3132 to rotate with the fixed gear 3132, and the planetary carrier 3131 is configured to support the ring gear 3133 and the planetary gear 3134.

Figure 9:
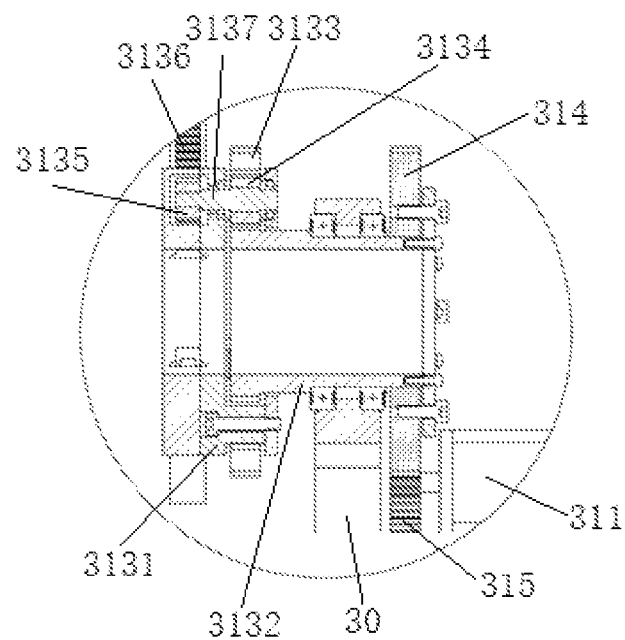
FIG. 9 is an enlarged view of position C of FIG. 8.
Figure 10:
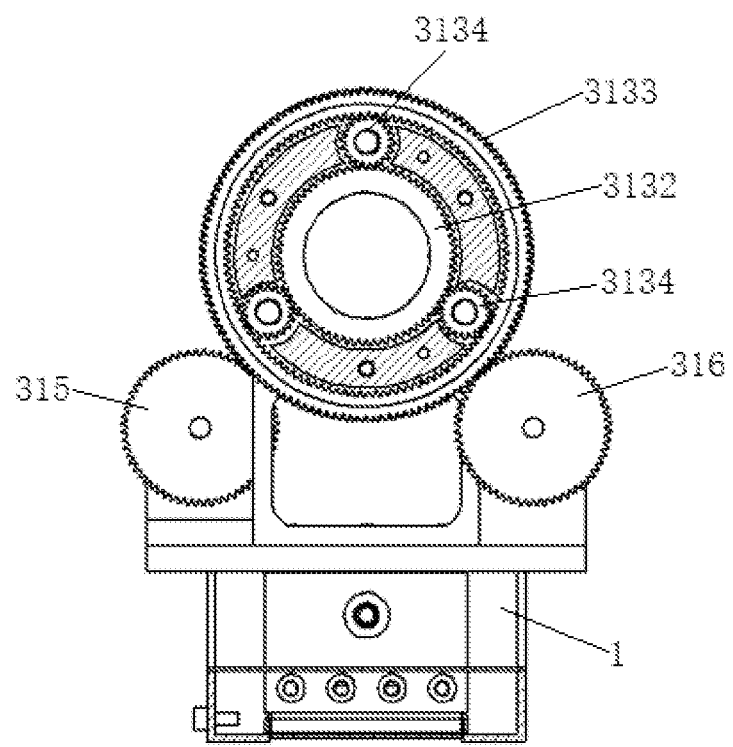
FIG. 10 is a sectional view taken along line B-B of FIG. 7 according to the present disclosure.
Figure 11:
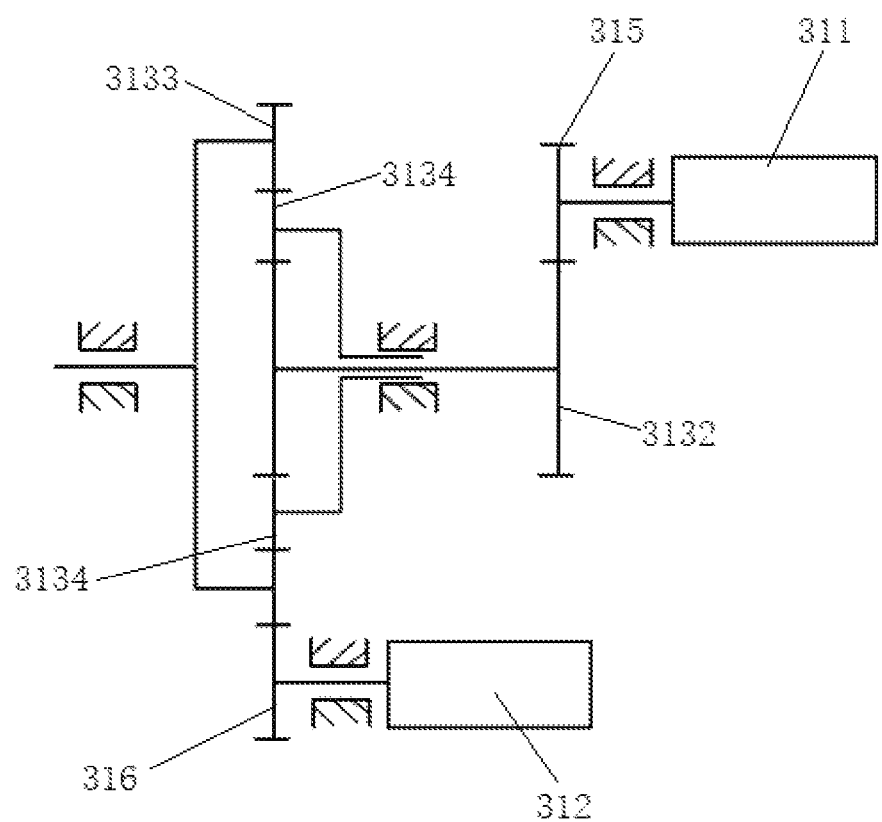
FIG. 11 is a transmission view of a cutting device according to the present disclosure.

Exemplarily, as shown in FIG. 9, the fixed gear 3132 may have a columnar structure. The driving assembly 31 in this embodiment may further include a power input gear 314 and a first transmission gear 315, and the power input gear 314 is engaged with the first transmission gear 315. The first transmission gear 315 is fixedly connected to an output end of the first driving piece 311, the power input gear 314 is fixedly connected to one end of the fixed gear 3132 by fasteners such as bolts, and the power input gear 314 can drive the fixed gear 3132 to rotate at the same speed. In this embodiment, only one end of the fixed gear 3132 far away from the power input gear 314 is provided with teeth, and the rest part is a polished rod structure.

Figure 7:
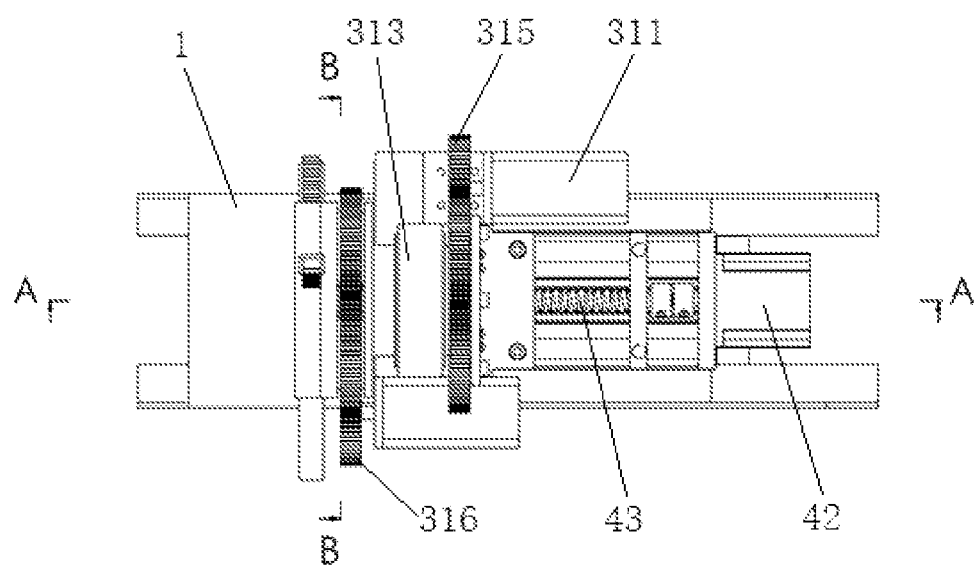
FIG. 7 is a top view of a cutting device assembled with a transverse feed device according to the present disclosure.

The ring gear 3133 is sleeved on an outer side of the other end of the fixed gear 3132, and can be driven by the second driving piece 312 to rotate. Specifically, as shown in FIG. 7, the driving assembly 31 in this embodiment may further include a second transmission gear 316, the second transmission gear 316 is fixedly connected to an output end of the second driving piece 312, the second transmission gear 316 is engaged with external teeth of the ring gear 3133, the second transmission gear 316 is driven by the second driving piece 312 to rotate, and the second transmission gear 316 can drive the ring gear 3133 to rotate.

The planetary gear 3134 is disposed between the fixed gear 3132 and the ring gear 3133 (shown in FIG. 9), and the planetary gear 3134 is engaged with internal teeth of the fixed gear 3132 and internal teeth of the ring gear 3133 to achieve revolution and rotation of the planetary gear 3134. The planetary gear 3134 and the tool drive gear 3135 are coaxially connected through a gear shaft 3137, so that the planetary gear 3134 can drive the tool drive gear 3135 to rotate synchronously. The tool drive gear 3135 can be engaged with a rack 3136 fixed on the cutting tool 32 to drive the rack 3136 to drive the cutting tool 32 to move in the radial direction, thereby achieving the adjustment of the cutting depth.

In this embodiment, a revolution speed and rotation speed of the planetary gear 3134 are affected by rotational speeds of the ring gear 3133 and the fixed gear 3132 and the number of gear teeth of a corresponding gear. In a case where modulus of the gear is the same, the rotation speed $n_2$ and the revolution speed $n_H$ of the planetary gear 3134, a rotational speed $n_1$ and the number $z_1$ of gear teeth of the ring gear 3133, a rotational speed $n_3$ and a gear diameter $z_3$ of the fixed gear 21 satisfy a following relationship:

$$n_2 = \frac{n_1 z_1 - n_3 z_3}{z_1 - z_3};$$

-continued
$$n_H = \frac{n_1 z_1 + n_3 z_3}{z_1 + z_3}.$$

When the rotational speed $n_1$ and the number $z_1$ of gear teeth of the ring gear 3133 and the rotational speed $n_3$ and the gear diameter $z_3$ of the fixed gear 3132 satisfy $n_1 z_1 = n_3 z_3$, the planetary gear 3134 only revolves without rotation. The planetary gear 3134 drives the tool drive gear 3135 through the gear shaft 3137. Since the planetary gear 3134 does not rotate, the rack 3136 has no displacement in the radial direction, that is, a feed depth of the cutting tool 32 does not change. If $n_1 z_1 \neq n_3 z_3$, the planetary gear 3134 has the rotation motion, and finally the feed depth of the cutting tool 32 changes to be adjusted to a required cutting depth. The rotational speed of the first driving piece 311 and the rotational speed of the second driving piece 312 can also be adjusted to adjust and control the revolution speed. The greater the revolution speed, the greater the rotational speed of the cutting tool 32, and the smoother the reaction force cone cut out.

The feed depth and the rotational speed of the cutting tool 32 can be controlled through a control of the first driving piece 311 and the second driving piece 312, so that the processing apparatus of this embodiment can process reaction force cones with different requirements.

In S03, the cutting device is started, and the cable is cut by the cutting device to form the reaction force cone.

That is, the cutting device 2 is started, so that the cutting device 2 can move along an axial direction of the cable 10 while cutting the cable 10, thereby forming the required reaction force cone.

Figure 8:
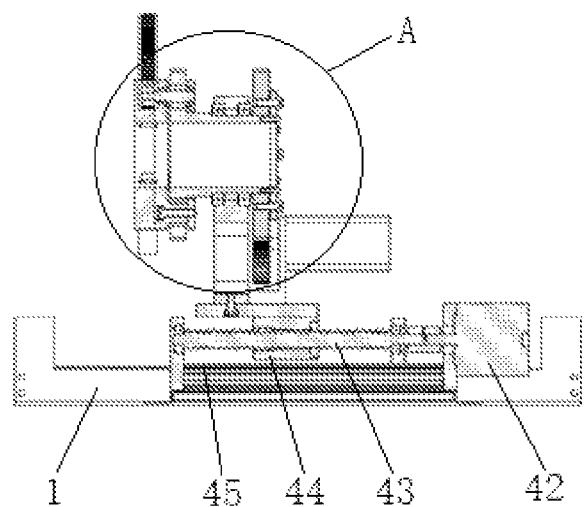
FIG. 8 is a cross-sectional view taken along line A-A of FIG. 7 according to the present disclosure.

In this embodiment, the movement of the cutting device 2 is mainly achieved through a transverse feed device 4. Specifically, as shown in FIGS. 3 and 8, the transverse feed device 4 includes a supporting base 41, a transverse feed motor 42, a lead screw 43, a slider 44 and a slide rail 45, where the supporting base 41 is fixedly mounted on the supporting seat 1, the transverse feed motor 42 is mounted on the supporting base 41, an output end of the transverse feed motor 42 is connected with the lead screw 43, the lead screw 43 is threadedly connected to the slider 44, the slider 44 is slidably disposed on the slide rail 45, the slide rail 45 is fixedly mounted on the supporting seat 1, and the cutting device 3 is fixedly connected to the slider 44 (for example, a cutting carrier body 30 of the cutting device 3 may be fixedly connected above the slider 44). The lead screw 43 is driven by the transverse feed motor 42 to rotate, which enables the slider 44 to slide along the slide rail 45 and drives the cutting device 3 to slide in the axial direction of the cable 10, so that the cutting device 3 can achieve transverse feed to complete the processing of the reaction force cone.

In this embodiment, a transverse feed speed of the cutting tool 32 can be adjusted through a control of a rotational speed of the transverse feed motor 42, and further, the feed depth and rotational speed of the cutting tool 32 can be controlled by the first driving piece 311 and the second driving piece 312, such cooperation enabling the processing apparatus of this embodiment to be adapted to the processing requirements of cables 10 with different sizes, and the reaction force cones with different shapes can be cut and processed.

When the method for processing the reaction force cone of the cable main insulating layer of this embodiment is used, firstly, the clamping device 2 is adjusted according to a diameter of the cable 10 to clamp the two ends of the cable 10, and at this time, the cable 10 is configured to pass through the cutting device 3. Subsequently, the cutting tool 32 of the cutting device 3 is controlled to feed to a preset cutting depth, then the cutting tool 32 is controlled to rotate, and at the same time, the transverse feed device 4 is controlled to drive the cutting device 3 to move in the axial direction to achieve the object of processing the reaction force cone.

What is claimed is:

1. A method for processing a reaction force cone of a cable main insulating layer, comprising:
    step 1, clamping two ends of a cable through a clamping device, and enabling the cable to pass through a cutting device;
    step 2, adjusting a cutting depth of the cutting device in a radial direction and a cutting position of the cutting device in an axial direction; and
    step 3, starting the cutting device, and cutting the cable by the cutting device to form the reaction force cone;
    wherein in the step 1, the clamping device comprises a clamping bracket, and two clamping jaws slidably disposed on the clamping bracket and configured to be close to and far away from each other; and
    wherein the clamping device further comprises a clamping gear which is rotatable, and two clamping racks engaged with the clamping gear, wherein each of the two clamping jaws is connected to a respective one of the two clamping racks.

2. The method according to claim 1, wherein the clamping device further comprises a rocker configured to drive the clamping gear to rotate, and a locking bolt configured to lock the rocker.

3. The method according to claim 2, wherein in the step 2, the cutting device comprises a driving assembly and a cutting tool driven by the driving assembly to rotate and move in the radial direction.

4. The method according to claim 1, wherein in the step 2, the cutting device comprises a driving assembly and a cutting tool driven by the driving assembly to rotate and move in the radial direction.

5. The method according to claim 4, wherein the driving assembly comprises a first driving piece, a second driving piece, and a planetary gear set jointly driven by the first driving piece and the second driving piece, wherein the planetary gear set is capable of driving the cutting tool to rotate synchronously and move in the radial direction.

6. The method according to claim 5, wherein the planetary gear set comprises a planetary carrier, a fixed gear driven by the first driving piece to rotate, a ring gear driven by the second driving piece to rotate, a planetary gear engaged between the fixed gear and the ring gear, and a tool drive gear driven by the planetary gear to rotate synchronously, wherein the tool drive gear is engaged with a rack fixed to the cutting tool, and the planetary carrier is fixedly sleeved on the fixed gear to support the ring gear and the planetary gear.

7. The method according to claim 6, wherein the driving assembly further comprises a power input gear fixedly connected to the fixed gear, wherein an output end of the first driving piece is capable of driving the power input gear to rotate.

8. The method according to claim 7, wherein the cutting device is driven by a transverse feed device to move in the axial direction, and the transverse feed device comprises a supporting base, a transverse feed motor mounted on the supporting base, a lead screw driven by the transverse feed motor to rotate, a slider threadedly connected to the lead screw and fixedly connected to the cutting device, and a slide rail fixedly disposed, wherein the slider is slidably disposed on the slide rail.

\* \* \* \* \*